Figure 1:
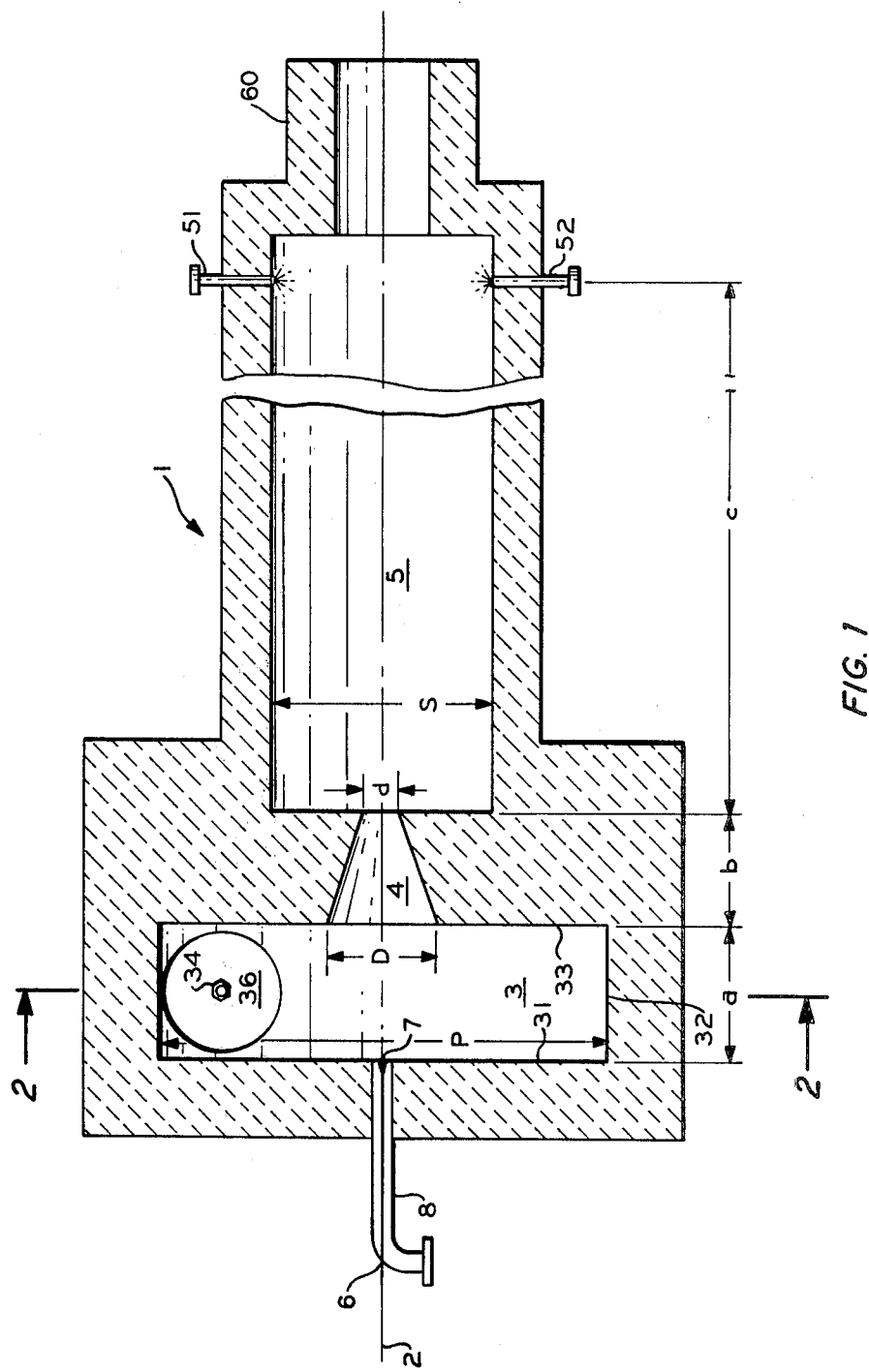

United States Patent [19]

Kraus et al.

[11] 4,267,160

[45] May 12, 1981

[54] CARBON BLACK FOR LOW-HYSTERESIS RUBBER COMPOSITIONS

[75] Inventors: Gerard Kraus; Harold R. Hunt, both of Bartlesville, Okla.

[73] Assignee: Phillips Petroleum Company, Bartlesville, Okla.

[21] Appl. No.: 75,874

[22] Filed: Sep. 17, 1979

Related U.S. Application Data

[60] Continuation of Ser. No. 822,779, Aug. 8, 1977, abandoned, which is a division of Ser. No. 681,977, Apr. 30, 1976, Pat. No. 4,071,496.

[51] Int. Cl.³ .......................... C01B 31/02; C09C 1/48
[52] U.S. Cl. ..................................... 423/456; 423/450
[58] Field of Search ............... 423/449, 450, 456, 459, 423/455; 422/150

[56] References Cited

U.S. PATENT DOCUMENTS

| | | | |
|---|---|---|---|
| 2,781,247 | 3/1957 | Krejci | 23/209.4 |
| 2,851,337 | 9/1958 | Heller | 423/455 |
| 2,918,353 | 12/1959 | Heller | 23/259.5 X |
| 3,079,236 | 2/1963 | Heller et al. | 423/456 |
| 3,748,100 | 7/1973 | Forseth | 423/450 X |
| 3,877,876 | 4/1975 | Cheng | 423/456 |
| 3,922,335 | 11/1975 | Jordan | 423/450 |
| 3,952,087 | 4/1976 | Antonsen | 423/450 |
| 4,077,761 | 3/1978 | Dollinger et al. | 431/8 |

*Primary Examiner*—O. R. Vertiz
*Assistant Examiner*—Gregory A. Heller

[57] ABSTRACT

A carbon black with a tint residual below −6 in a rubber composition causes the hysteresis or heat buildup of such a rubber composition to be significantly lower than that of a rubber composition incorporating a carbon black with a higher tint residual, while the abrasion resistance of such rubber compositions incorporating these different blacks remains essentially unchanged. Tint residual is the difference between the measured tint and the tint calculated from the structure, nitrogen surface area, and CTAB surface area in accordance with a specific formula disclosed.

10 Claims, 3 Drawing Figures

CARBON BLACK FOR LOW-HYSTERESIS RUBBER COMPOSITIONS

This application is a continuation of copending, now abandoned, application Ser. No. 822,779, filed Aug. 8, 1977, which was a division of application Ser. No. 681,977, filed Apr. 30, 1976, now U.S. Pat. No. 4,071,496.

This invention relates to carbon black. In a more specific aspect, this invention relates to rubber compositions containing carbon black. Furthermore, the invention relates to carbon black reactors in which carbon blacks can be made.

BACKGROUND OF THE INVENTION

A broad variety of carbon blacks have been disclosed in the art. These blacks differ in many properties from each other and are made by different procedures. The main field of use of the blacks depends upon their properties. Since the carbon black as such cannot be sufficiently characterized by its chemical composition or by its ingredients, it has become widely accepted to characterize the carbon black by the properties it exhibits. Thus, the carbon black can, e.g., be characterized by its surface area which is usually an inverse measurement of the nodule size. Another important characteristic of the carbon black is its structure, which is a measure of the complexity of the individual carbon black aggregates or of the number of nodules "fused" together in one carbon black aggregate.

Great efforts have been made in the industry to correlate properties of rubbers incorporating carbon black and properties of carbon black. Unfortunately, there is not one single property of carbon black that, if made high or low enough, results in an ideal rubber composition. Certain properties of carbon black are related to abrasion of the rubber composition; others are related to the tensile strength; others are related to the heat buildup; etc.

Efforts have been made to correlate the tint or tinting strength of carbon black to the abrasion resistance of rubbers. In this connection the statement has been made that high-tint carbon black incorporated in rubber results in highly abrasion-resistant rubber compositions. As will be shown, no such correlation exists.

High abrasion resistance of a carbon black/rubber composition is one desirable property of such a composition. Another desirable property is low heat buildup or low hysteresis. The heat buildup is a measurement of how much of the elastic deformation energy put into a carbon black/rubber composition remains in this composition as heat after the deformation forces have been released. The hysteresis, or heat buildup, is measured by measuring the temperature of a sample subjected to deformations. This property, hysteresis, of carbon black/rubber compositions is very important, particularly for tires made with such a composition. The higher the heat buildup, the greater the chances are that tires made from such rubbers are destroyed or even begin to burn. Serious accidents have been attributed to the failure of tires made from such high heat buildup rubber compositions. It would, therefore, be very desirable to reduce the heat buildup of rubber/carbon black compositions.

THE INVENTION

It is thus one object of this invention to provide a carbon black which, incorporated in rubber, causes low heat buildup of the rubber composition.

Another object of this invention is to provide a carbon black which, when incorporated in rubber, results in a rubber composition having both a low heat buildup and a high abrasion resistance.

A further object of this invention is to provide a rubber composition having a low heat buildup.

Yet another object of this invention is to provide a rubber composition having both low heat buildup and high abrasion resistance.

Figure 2:
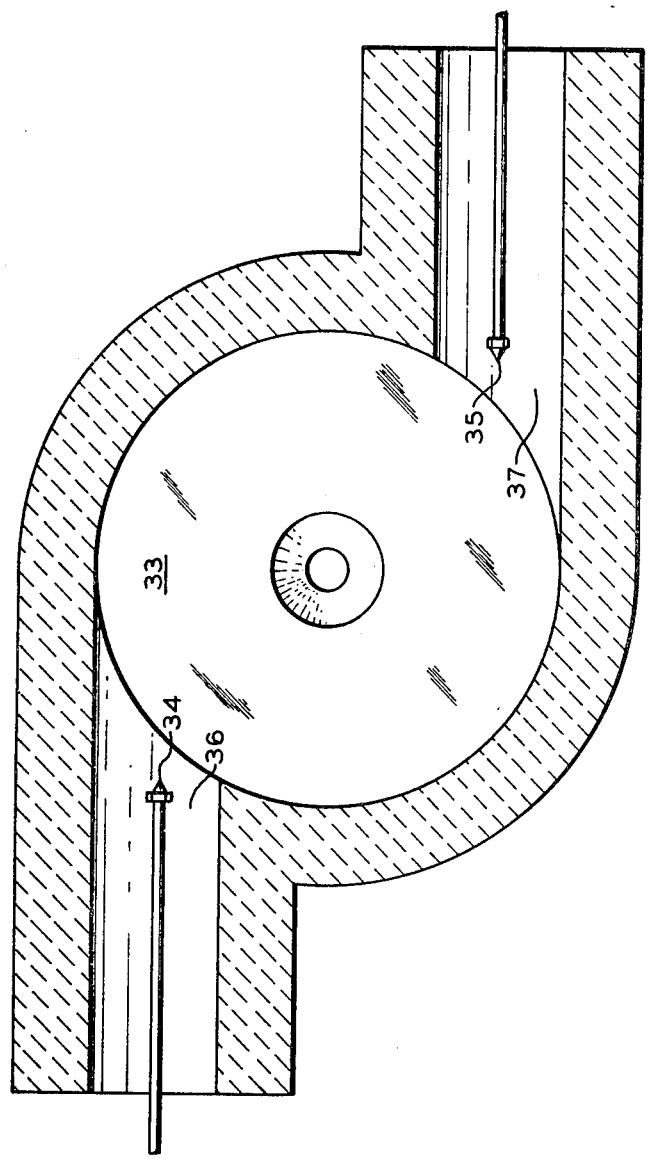
Figure 3:
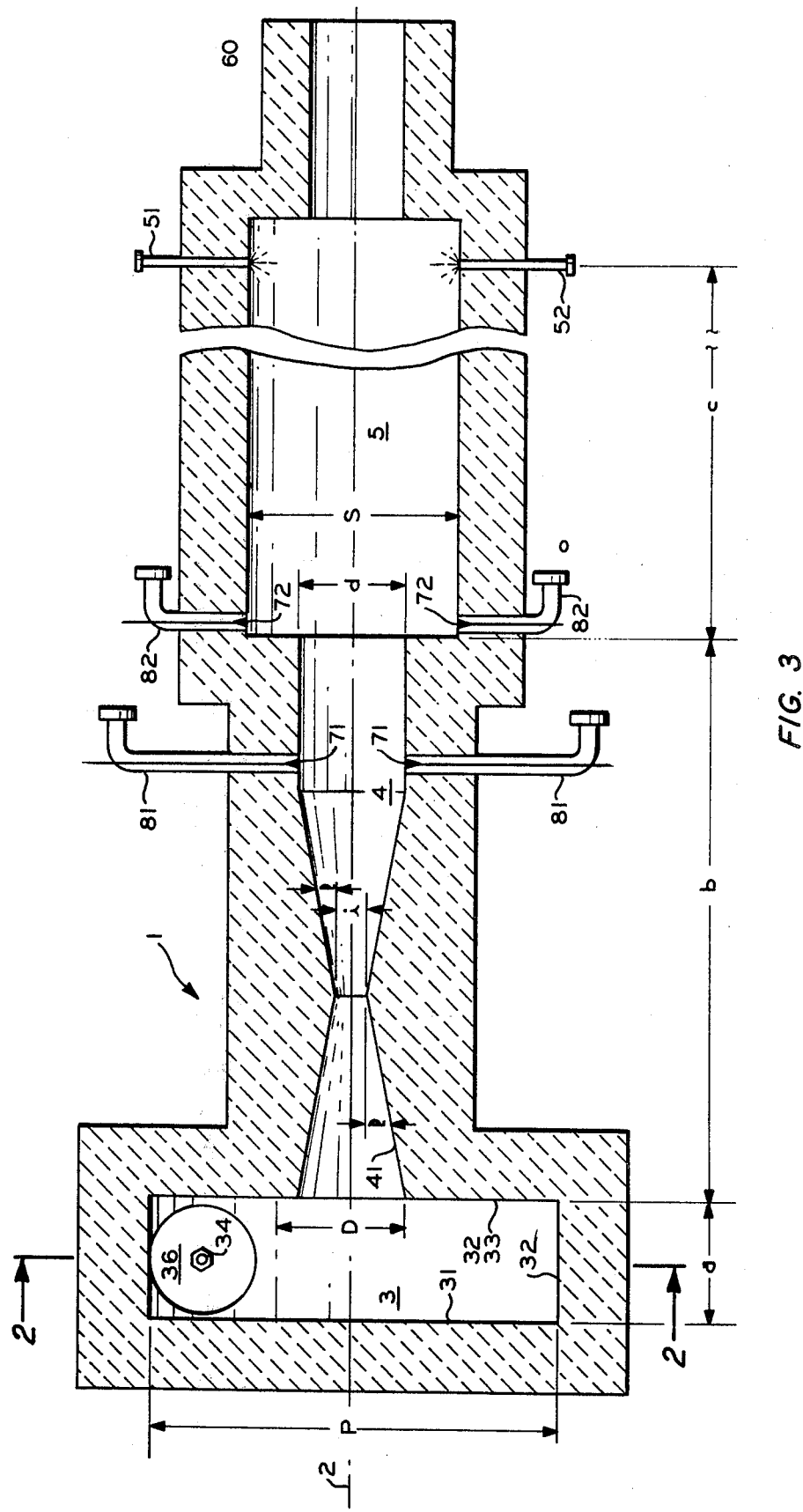

These and other details, advantages, embodiments, and features of the present invention will become apparent to those skilled in the art from the following detailed description of the invention, the appended claims, and the drawing, in which FIGS. 1 and 3 are longitudinal cross-sections through two carbon black reactors, and FIG. 2 is a cross-section through the reactors shown in FIGS. 1 and 3.

In accordance with the invention, there is now provided a novel carbon black characterized by having a tint residual of about −6 or less. The tint residual is a property of the carbon black defined by the following formula:

$$TR = T - [56.0 + 1.057(CTAB) - 0.002745(CTAB)^2 - 0.2596(DBP) - 0.201(N_2SA - CTAB)].$$

In this formula, the abbreviations used have the following meanings and the properties are measured as described:

TR: This is tint residual.

CTAB: This is the surface area of the carbon black measured as described by J. Janzen and G. Kraus in Rubber Chemistry and Technology, 44, 1287 (1971), m$^2$/g.

$N_2SA$: This is the surface area of the carbon black measured using nitrogen in accordance with the ASTM method D-3037-71T, m$^2$/gm.

DBP: This is the structure of the carbon black in cc/100 g and is measured in accordance with U.S. Pat. No. 3,548,454 and, after crushing, by method B in accordance with ASTM D-2414-70. This property is also referred to as 24M4 DBP.

T: This is the tint or tinting strength of the carbon black measured by arbitrarily assigning the reference black IRB No. 3 the value of 100; the tint is measured in accordance with ASTM 3265-75.

Among the carbon blacks defined by the formula given above, those that are further characterized by having surface area and structure properties within the following ranges are particularly preferred:

CTAB: 73 to 140 square meters/gram
DBP: 67 to 111 cc/100 g
($N_2SA$-CTAB): 23 square meters/gram or less All these properties, namely, CTAB, DBP, and $N_2SA$, are defined and measured as disclosed above.

For best overall performance in rubber compositions, a carbon black as defined above is presently preferred that has a tint residual TR as defined of −6 to −20.

In accordance with another embodiment of this invention, there is provided a rubber composition exhibiting both low heat buildup and satisfactory tread wear properties. This rubber composition comprises 100 parts by weight of rubber and 30 to 120 parts by weight of carbon black having a tint residual of about −6 or less. The tint residual is defined as above. The preferred rubber compositions are those incorporating the preferred carbon blacks as defined above.

The rubber in the rubber composition of this invention can be natural or a synthetic rubber. Among the synthetic rubbers the polymers and copolymers of at least one conjugated acyclic alkadiene having 4 to 8 carbon atoms, as well as the copolymers of at least one conjugated acyclic alkadiene having 4 to 8 carbon atoms and at least one monovinyl arene with the vinyl substituent attached to an arene ring carbon atom, are presently preferred. Particularly preferred are polymers and copolymers of butadiene, isoprene, and piperylene with styrene or a methylstyrene.

Yet more specifically, and in accordance with another embodiment of this invention, there is provided a rubber composition which is particularly useful for tire tread applications and which is essentially composed of ingredients and quantities as shown in the following tabulation, containing, in addition, standard additives such as antioxidants, etc.:

| Tread Black Rubber | Parts by Weight |
| --- | --- |
| Rubber | 100 |
| Carbon black | 65-90 |
| Extender oil | 15-65 |

The carbon black in this composition is, again, defined by having a tint residual of −6 or less.

Similarly, and in accordance with a still further embodiment of this invention, a rubber composition is provided which is particularly applicable in the tire carcass applications. This rubber composition consists essentially of the ingredients listed in the following tabulation and, in addition, also contains standard additives such as antioxidants, etc.:

| Carcass Black rubber | Parts by Weight |
| --- | --- |
| Rubber | 100 |
| Carbon black | 30-60 |
| Extender oil | 5-10 |

In this carcass rubber composition, too, the carbon black is defined by having a tint residual of −6 or less.

In accordance with a still further embodiment of this invention, there is provided a carbon black reactor in which the low tint residual carbon black can be made. This carbon black reactor is basically a tubular carbon black reactor with a wide precombustion section followed by a narrow first reaction section which in turn is followed by a wider second reaction section. The diameter of the precombustion section is about 9 to 12 inches whereas the axial length of this precombustion section is about 3 to about 6 inches. The first reaction section, which is a narrow section, has an upstream diameter of about 2 to 4 inches and an axial length of about 3 to 15 inches. The second reaction section has an upstream diameter which is about 2 to 5 times as wide as the downstream diameter of the first reaction section, so that the cross-section of the reaction sections abruptly widens from said first section to said second section. Means for generating a hot combustion gas vortex in the precombustion section, as well as means for introducing hydrocarbon feedstock, are provided for. The hydrocarbon feedstock can be introduced either at the axis and at the upstream confining wall of the precombustion section or can be introduced at a location at the tubular reactor wall within the downstream portion of the first reaction section or at the reactor wall in the proximity of the abrupt diameter change from the first to the second reaction section.

The first reaction section, in accordance with a first embodiment of this reactor in accordance with this invention, is about 3 to 8 inches long and frustoconically shaped. The first reaction section in this embodiment converges in downstream direction at an angle between the reactor axis and the frustoconical surface in the range of about 10 to about 18 degrees, and the downstream diameter of this first reaction section is about 1 to 2 inches.

In another embodiment of the reactor of this invention, the first reaction section is essentially a cylindrical reaction section having a venturi-shaped choke therein. The length of the first reaction section in this embodiment is about 6 to 18 inches, and the venturi-shaped choke located at the upstream portion of the first reaction section is about 3 to about 9 inches long in axial direction. The throat diameter of the venturi-shaped choke is about 1 to 2 inches.

The invention will be still more fully understood from the description of the reactors, as well as the specific examples.

In the drawing, two specific reactors are shown in cross-section. FIGS. 1 and 2 show a tubular carbon black reactor confined by a shell 1 of heat-resistant material such as ceramic. The internal shape of the reactor is essentially rotationally symmetric around the reactor axis 2. The reactor is composed of a precombustion section 3, a first reaction section 4, and a second reaction section 5. All these sections are in open communication, axially aligned, and operatively connected with each other. The first reaction section 4 is essentially a frustoconically shaped section converging in downstream direction. The precombustion section 3 is a cylindrical section confined by an upstream wall 31, a cylindrical wall 32, and a downstream confining wall 33.

Normally liquid hydrocarbon feedstock can be introduced into the reactor along line 6 which is equipped with a discharge nozzle 7, which is arranged flush with the upstream wall 31 of the precombustion section 3. The hydrocarbon feed line 6, as well as the nozzle 7, are surrounded by a pipe 8 through which a relatively small quantity of air can be introduced into the reactor. This so-called jacket air is introduced in order to protect the nozzle and the hydrocarbon feed pipe 6.

A vortex of hot combustion gases can be generated within the precombustion section 3. Gas is introduced into the precombustion section 3 for this purpose from gas discharge nozzles 34 and 35 (see FIG. 2). This gas, which usually is natural gas, is combusted with air which is introduced via channels 36 and 37, respectively, which surround the gas discharge nozzles 34 and 35.

The hydrocarbon feedstock axially introduced from nozzle 7 is contacted with the vortex of hot combustion gases and the reaction mixture is passed through the first reaction section 4 and, after an abrupt expansion, through the second reaction section 5. At the end of the reaction section 5, the reaction mixture is contacted with a quenching fluid, e.g., water or cold smoke, injected in radial direction into the second reaction section 5 from lines 51 and 52, respectively. Thus-quenched carbon black-containing smoke can be withdrawn from the reactor via a smoke withdrawal line 60.

A similar reactor as that shown in FIGS. 1 and 2 is shown in FIG. 3. The cross-section taken along line 2—2 of this reactor is the same as of the reactor in FIG. 1, and reference is therefore also made for this reactor to FIG. 2. The main difference between the reactors shown in FIGS. 1 and 3 is the shape of the first reaction section and the location for the introduction of the hydrocarbon feed. The first reaction section 4 is an essentially cylindrically shaped section which is provided with a ventur-shaped choke 41. In addition, two different means for the introduction of hydrocarbon feedstock are provided for which can be used individually or in combination. The first means for introducing hydrocarbon feedstock into this reactor consist of radial spray nozzles 71 surrounded by cooling pipes 81 through which cooling "jacket" air can be injected. The second means for introducing hydrocarbon feedstock are located proximate to the abrupt expansion between the first reaction section 4 and the second reaction section 5. These hydrocarbon feedstock injection means also consist of spray nozzles 72 for radial injection of hydrocarbon feed surrounded by cooling jacket 32 for injection of a small quantity of cooling or "jacket" air. Thus, as shown by these two embodiments of the reactors, the hydrocarbon feedstock can be injected into the reactors either upstream flush with the upstream wall or relatively far downstream in the first reaction section or even close to the abrupt diameter change into the second reaction section at the upstream end thereof. In this sense the term "first reaction section" is not to be understood in a technically limiting sense. With these exceptions, the second reactor shown in FIG. 3 is the same as that shown in FIG. 1, and the same reference numerals have been used so that a detailed explanation of the other elements of this reactor can be avoided.

A typical reactor in accordance with this invention and in accordance with FIGS. 1 and 2 will have the following dimensions:

| P | (diameter of precombustion section 3) | 10¼ inches |
|---|---|---|
| D | (diameter of upstream end of first reaction section 4) | 3 inches |
| d | (diameter of downstream end of first reaction section 4) | 1.6 inches |
| S | (diameter of second reaction section 5) | 6 inches |
| a | (axial length of the precombustion section 3) | 4 inches |
| b | (axial length of the first reaction section 4) | 3¾ inches |
| c | (axial length of the second reaction section 5) | 52 inches |

A typical reactor in accordance with FIGS. 2 and 3 will have the dimensions shown in the following tabulation:

| P | (diameter of precombustion secton 3) | 10⅜ inches |
|---|---|---|
| D | (diameter of upstream end of first reaction section 4) | 3 inches |
| d | (diameter of downstream end of first reaction section 4) | 3 inches |
| S | (diameter of second reaction section 5) | 6 inches |
| a | (axial length of the precombustion section 3) | 4 inches |
| b | (axial length of the first reaction section 4) | 12 inches |
| c | (axial length of the second reaction section 5) | 42 inches |
| i | (diameter of the venturi throat) | 1.6 inches |
| l | (angle between venturi and axis) | 12 degrees |

The invention will be yet more fully understood from the following examples.

EXAMPLE I

Three runs to produce a low tint residual carbon black in accordance with this invention were carried out in a reactor as described in connection with FIGS. 1 and 2 and as specified with respect to the dimensions thereof above. The feed oil used in all the runs was Ponca #7: BMCI=120; mid-boiling point (50%)=755° F.; average boiling point=804° F. The reactants introduced into the reactor, as well as the properties of the carbon black produced, are shown in the following table:

TABLE I

|  | Run 1 | Run 2 | Run 3 |
|---|---|---|---|
| Tangential air, SCF/hr. | 11,000 | 7,500 | 6,000 |
| Tangential natural gas, SCF/hr. | 732 | 500 | 400 |
| Ratio A/G (volume ratio)** | 15/1 | 15/1 | 15/1 |
| % Excess air | 50 | 50 | 50 |
| Axial air, SCF/hr. | 0 | 220 | 175 |
| Oil, pounds/hr. | 101 | 69.6 | 47.3 |
| Nozzle for oil | 2 radial jets | spray angle 90° | spray angle 90° |
| Nozzle position | flush* | flush* | flush* |
| Air/oil, SCF/pound | 108.9 | 110.9 | 130.5 |
| Carbon Black Product: |  |  |  |
| $N_2SA$, $m^2/gm$ | 90 | 93 | 125 |
| CTAB, $m^2/gm$ | 88 | 88 | 104.5 |
| 24M4 DBP, cc/100 gm | 87 | 100 | 103 |
| Tint | 88 | 91 | 96.5 |
| Tint residual, TR | −12.8 | −9.8 | −9.1 |

*"Flush" means oil nozzle was at upstream face of the precombustion chamber.
**Stoichiometric for air/natural gas is 10/1.

The above data show that in a carbon black reactor as shown in FIGS. 1 and 2, the low tint residual carbon black can be made. Furthermore, the data shown above indicate that the tint residual is particularly low for low air-to-oil ratios.

EXAMPLE II

In a reactor as shown in FIGS. 2 and 3, the particular dimensions of which have been described in the above tabulation, low tint residual carbon black, as well as high tint residual carbon black, were made. The only difference between the reactor used for this example and the reactor shown in FIGS. 2 and 3 is that the oil injection nozzle and the oil injection nozzle position were the same as that shown in connection with the reactor of FIGS. 1 and 2 for Runs 4 and 6. In Run 5 the oil nozzle was inserted 2 inches into precombustion zone. Thus, the hydrocarbon feedstock was injected into the reactor essentially in axial direction at a location where the spray nozzle was arranged flush with the upstream confining wall of the precombustion section and the nozzle was arranged on the reactor axis. The ingredients injected into the reactor, their quantities and ratios, as well as the properties of the carbon black made in accordance with this example, are shown in the following Table II.

TABLE II

|  | Run 4 | Run 5 | Run 6 |
|---|---|---|---|
| Tangential air, SCF/hr. | 9,000 | 6,000 | 6,000 |
| Tangential propane, SCF/hr. | 255.6 | 213 | 170.4 |
| Ratio of air/fuel (vol. ratio)** | 36.2/1 | 23.9 | 36.1/1 |
| % Excess air | 44.8 | 15.6 | 44.4 |
| Axial air, SCF/hr. | 262.4 | 175 | 175 |
| Oil, pounds/hr. | 70.6 | 45 | 56.3 |
| Nozzle for oil | spray angle 90° | spray angle 90° | spray angle 90° |
| Nozzle position* | flush | 2" in pre-combustion zone | flush |
| Air/oil, SCF/pound | 134.2 | 137.2 | 109.7 |
| Carbon Black Product: |  |  |  |
| $N_2SA$, $m^2$/gm | 130 | 119 | 99 |
| CTAB, $m^2$/gm | 117 | 116 | 97 |
| 24M4 DBP, cc/100 gm | 98.5 | 97 | 96 |
| Tint | 107.1 | 128 | 99.7 |
| Tint residual, TR | −6.8 | +12.1 | −7.7 |

*"Flush" means the nozzle is at upstream end of precombustion chamber.
**Stoichiometric for air/propane is 25/1.

The carbon black made in accordance with this example for Runs 4 and 6 showed a low tint residual, whereas the carbon black made in accordance with Run 5 showed a very high tint residual.

EXAMPLE III

The three carbon blacks made in accordance with Example I were compared to three commercially available carbon blacks that were matched to the carbon blacks prepared in accordance with Example I as far as the structure and surface area were concerned but that differed essentially from these blacks as far as the tint was concerned. Therefore, in accordance with the formula of this invention, the tint residual of the carbon blacks to be compared was quite different. The properties of the carbon blacks which were compared are listed in the following Table III.

TABLE III

|  | N330 | | N347 | | N220 | |
|---|---|---|---|---|---|---|
|  | Low Hyst. | Regular (IRB #3) | Low Hyst. | Regular (#1 Control) | Low Hyst. | Regular (#7 Control) |
|  | Run 1 | | Run 2 | | Run 3 | |
| CTAB, $m^2$/g | 83 | 83 | 88 | 91 | 105 | 110 |
| 24M4, cc/100 g | 87 | 88 | 100 | 100 | 103 | 100 |
| Tint | 88 | 100 | 91 | 105 | 97 | 110 |
| Tint residual, TR | −13 | −2 | −10 | +2 | −9 | 0 |
| H.I. (Ultrafiltration)* | 3.50 | 2.35 | 3.18 | 2.17 | 3.10 | 2.20 |

*Heterogeneity index determined by ultrafiltration as described in Rubber Chemistry Technology, Vol. 48, No. 4, September-October, 1975, pages 542-545.

The regular IRB #3 is an industry reference black commercially available in the industry. The regular #1 control carbon black is a carbon black commercially available from the Phillips Petroleum Company under the designation Philblack ® N347. Similarly, the regular #7 control carbon black is a carbon black commercially available from the Phillips Petroleum Company, Bartlesville, Okla., under the designation N220.

The three carbon blacks listed were incorporated into various rubber compositions of natural rubber and of synthetic rubber in accordance with the following two recipes:

|  | Recipe 1 SBR/BR Tread | Recipe 2 NR Tread |
|---|---|---|
| SBR-1712[1] | 96.25 | — |
| Cis-4 1203[2] | 30 | — |
| NR (SMR-5 LBH)[3] | — | 100 |
| Carbon black[4] | 75 | 50 |
| Philrich ®#5 | 13.75 | 7 |
| Zinc oxide | 3 | 3 |
| Stearic acid | 2 | 2 |
| BLE-25[6] | 1 | — |
| Santoflex AW[7] | 1.5 | 1.5 |
| Flexamine C[8] | — | 1 |
| Sulfur | 1.9 | 2.5 |
| Santocure[9] | 1.1 | 0.6 |
| cyuram MS[10] | 0.15 | — |

[1]A polybutadiene/styrene (76.5/23.5 weight ratio) copolymer rubber, polymerized at 41° F. and commerically available under the trademark Philprene® SBR 1712 from Phillips Petroleum Company.
[2]A high cis-polybutadiene rubber commercially available under the trademark Cis-4 ®polybutadiene 1203, Phillips Petroleum Company.
[3]Natural rubber, SMR-5LBD, is a natural rubber broken down to preselected Mooney value of 54 raw Mooney at 212° F.
[4]The various carbon blacks listed above were incorporated into the rubber for comparative runs.
[5]A highly aromatic extender oil available from Phillips Petroleum Company, Bartleville, Oklahoma.
[6]A high temperature reaction product of diphenylamine and acetone, a commercially available antioxidant.
[7]6-ethoxy-1,2-dihydro-2,2,4-trimethylquinoline, antioxidant, and flex-cracking inhibitor.
[8]Complex diarylamine-ketone reaction product (65%) and N,N'-diphenyl-p-phenylenediamine (35%), an antioxidant.
[9]N-cycohexyl-2-benzothiazole sulfenamide, an accelerator.
[10]Tetrmethylthiuram monosulfide, an accelerator.

The twelve rubber compositions in accordance with Recipe 1 and Recipe 2 given above were then formed into test specimens and tested for various rubber properties. The test results are shown in the following Table IV:

TABLE IV

|  | N330 | | N347 | | N220 | |
|---|---|---|---|---|---|---|
|  | Low Hyst. | Regular (IRB #3) | Low Hyst. | Regular (#1 Control) | Low Hyst. | Regular (#7 Control) |
|  | Run 1 | | Run 2 | | Run 3 | |
|  | Properties in NR Tread (Recipe 2) | | | | | |
| ΔT, °F. (Std. test) | 39 | 47 | 45 | 51 | 47 | 53 |
| (Severe test) | 53 | 83 | 90 | 104 | 112 | 121 |
| Resilience, % | 72 | 67 | 71 | 66 | 70 | 65 |
| Modulus, psi | 1600 | 1550 | 1900 | 1880 | 1850 | 1750 |
| Tensile, psi | 3950 | 3980 | 3650 | 3980 | 4030 | 4280 |
| Elongation, % | 580 | 590 | 510 | 550 | 560 | 610 |
| 212° F. tear, lb/in. | 370 | 360 | 340 | 370 | 320 | 360 |

TABLE IV-continued

|  | N330 | | N347 | | N220 | |
| --- | --- | --- | --- | --- | --- | --- |
|  | Low Hyst. Run 1 | Regular (IRB #3) | Low Hyst. Run 2 | Regular (#1 Control) | Low Hyst. Run 3 | Regular (#7 Control) |
| Hardness | 58 | 58 | 60 | 63 | 61 | 61 |
| Properties in SBR/BR Tread (Recipe 1) | | | | | | |
| ΔT, °F. (orig.) | 55 | 66 | 63 | 68 | 63 | 70 |
| (aged) | 53 | 66 | 61 | 68 | 61 | 68 |
| Resilience, % | | | | | | |
| (orig.) | 65 | 54 | 60 | 56 | 59 | 52 |
| (aged) | 67 | 57 | 64 | 59 | 64 | 59 |
| Modulus, psi | 1400 | 1300 | 1850 | 1800 | 1640 | 1440 |
| Tensile, psi | 2870 | 2940 | 3040 | 3030 | 3000 | 3130 |
| Elongation, % | 520 | 580 | 460 | 470 | 480 | 550 |
| 212° F. tear, lb/in. | 230 | 260 | 190 | 210 | 220 | 250 |
| Hardness | 55 | 58 | 61 | 62 | 58 | 60 |

ΔT: This is the heat buildup in °F. determined in accordance with the standard test ASTM D-623-67. In the severe test, the operation as disclosed in ASTM D-623-67 is followed.
Resilience: Determined in accordance with ASTM D-945-59.
Modulus: Determined in accordance with ASTM D-412-68.
Tensile: Determined in accordance with ASTM D-412-68.
Elongation: Determined in accordance with ASTM D-412-68.
212° F. tear: Determined in accordance with ASTM D-624, using Die A.
Hardness: Determined in accordance with ASTM D-676-59.

All the data shown above indicate that very significant improvements in the heat buildup ΔT and resilience are achieved by the carbon blacks of this invention as compared to carbon blacks having similar properties but higher tint residual TR. An improvement in the heat buildup of 6 to 8 degrees is very important and the results of the severe test further show an even higher improvement in the heat buildup or temperature change in a rubber composition incorporating the carbon black of this invention as compared to a rubber composition incorporating a similar carbon black with a higher tint residual.

EXAMPLE IV

The carbon blacks made in accordance with Example II, as well as another carbon black having properties closely similar to the carbon black in Run 6, but different in the tint residual, were evaluated in rubber tests. These carbon blacks were incorporated into rubber compositions as shown above in connection with Recipe No. 1. The properties of the carbon blacks, as well as the rubber test results, are shown in the following Table V.

TABLE V

|  | Run 4 | Run 5 | Run 6 | Run 7 |
| --- | --- | --- | --- | --- |
| CTAB, m²/gm | 114 | 118 | 99 | 105 |
| 24M4, cc/100 g | 100 | 97 | 97 | 93 |
| Tint | 106 | 124 | 99 | 117 |
| Tint residual, TR | −6 | 8 | −7 | 5 |
| H.I. (Ultrafiltration) | 2.65 | 1.96 | 2.87 | 1.75 |
| Cut growth, in.[1] | 0.068 | 0.124 | 0.033 | 0.108 |
| ΔT, °F. (STD) | 64 | 74 | 62 | 66 |
| Resilience, % | 59 | 53 | 60 | 57 |
| Treadwear[2] | 111 | 110 | 99 | 103 |

[1]Cut growth: Determined in standard tire tests.
[2]Treadwear: Determined in standard tire tests.

The above-reported data again show that the resilience and heat buildup or hysteresis of a rubber composition incorporating a low tint residual carbon black are considerably improved as compared to a high tint residual carbon black. In addition, however, the rubber tests show that the treadwear remains unchanged for the carbon blacks compared.

EXAMPLE V

In the following three recipes, typical compositions for passenger car tire tread, passenger car tire carcasses, and truck tire carcasses are given:

| COMPONENT | Pounds |
| --- | --- |
| Passenger Car Tire Tread | |
| Philiprene ® SBR 1712[2] | 96.25 |
| Cis-4 ® Polybutadiene 1203[3] | 30 |
| Carbon black | 75 |
| Philrich ® 5[6] | 13.75 |
| Zinc oxide | 3 |
| Stearic acid | 2 |
| BLE-25[8] | 1 |
| Santoflex AW[9] | 1.5 |
| Santocure[10] | 1.1 |
| Cyuram MS[11] | 0.15 |
| Sulfur | 1.9 |
| Passenger Car Tire Carcasses | |
| Natural rubber | 40 |
| Philprene ® SBR 1708[1] | 41.25 |
| Cis-4 ® Polybutadiene 1203[3] | 30 |
| Carbon black | 50 |
| Rosin oil | 3 |
| Zinc oxide | 4 |
| Stearic acid | 2 |
| Agerite Resin D[4] | 1.5 |
| Amax #1[5] | 0.8 |
| Diphenylguanidine | 0.1 |
| Sulfur | 2.5 |
| Truck Tire Carcasses | |
| Natural rubber | 80 |
| Cis-4 ® Polybutadiene 1203[3] | 20 |
| Carbon black | 50 |
| Philrich ® 5[6] | 7 |
| Zinc oxide | 5 |
| Stearic acid | 3 |
| Sulfur | 1.9 |

-continued

| COMPONENT | Pounds |
|---|---|
| NOBS Special[7] | 0.9 |

[1] Cold, oil-extended non-staining SBR rubber: 100 parts by weight low ash, low water absorption, light-colored butadiene-styrene (75-25 weight ratio) copolymer, emulsion-polymerized at 41° F. using fatty acid soap and 37½ parts by weight naphthenic processing oil. Commercially available from Phillips Petroleum Company, Bartlesville, Oklahoma.
[2] A butadiene/styrene copolymer rubber (76.5/23.5 butadiene/styrene weight ratio) commercially available from Phillips Petroleum Company.
[3] A high cis-polybutadiene rubber commercially available from Phillips Petroleum Company.
[4] An antioxidant, 1,2-dihydro-2,2,4-trimethylquinoline.
[5] N-oxydiethylene benzothiazole-2-sulfenamide and benzothiazyldisulfide, a delayed action primary accelerator.
[6] A highly aromatic extender oil commercially available from Phillips Petroleum Company.
[7] N-oxydiethylene-2-benzothiazyl sulfenamide.
[8] High-temperature reaction product of diphenylamine and acetone, an antioxidant.
[9] 6-Ethoxy-1,2-dihydro-2,2,4-trimethylquinoline, an antioxidant and flex-cracking inhibitor.
[10] An accelerator, N-cyclehexyl-2-benzothiazole sulfenamide.
[11] An accelerator, tetramethylthiuram monosulfide.

The tire rubber compositions shown above incorporating the carbon black of the present invention will show reduced hysteresis or heat buildup, as has been shown in the previous examples. This feature advantageously will decrease the risk of tire blowouts and the tires catching fire.

Reasonable variations and modifications will become apparent to those skilled in the art from a reading of this disclosure without departing from the spirit and scope thereof.

We claim:

1. A process for making carbon black having a tint residual −6 or less, comprising the steps of:
   (a) passing a vortex of hot combustion gases through a reaction flow passage in a carbon black reactor having in series a first section of a first diameter, a second section having an inlet of a second diameter smaller than said first diameter and an outlet of a third diameter, and a third section of a fourth diameter larger than said third diameter, said reaction flow passage abruptly widening from said second section to said third section so that by passing the vortex of hot combustion gases from said second section to said third section said gases are rapidly expanded; and
   (b) introducing a hydrocarbon feedstock radially into said hot combustion gases at a location in said third section adjacent the reactor wall and in the proximity of the abrupt diameter change between the second section and the third section.

2. A process as in claim 1 wherein the fourth diameter is 2 to 5 times larger than the third diameter.

3. A process as in claim 2 further comprising introducing a hydrocarbon feedstock into the second section.

4. A process as in claim 3 wherein said vortex of hot combustion gases passing through the second section is passed through a zone of restriction having a fifth diameter smaller than said second and said third diameters.

5. A process as in claim 4 wherein the first diameter is about 9 to 12 inches and the first section has a length of about 3 to 6 inches; and wherein the second diameter is about 2 to 4 inches and the second section has a length of about 6 to 18 inches, and wherein the second section has a venturi shaped choke with a length of about 3 to 9 inches and a throat diameter of about 1 to 2 inches, the diameter of the throat being the fifth diameter; and wherein the third diameter is about 2 to 4 inches.

6. A process for making carbon black having a tint residual of less than −6 and a tint value of less than 100 comprising:
   (a) passing a vortex of hot combustion gases through a reaction flow passage in a carbon black reactor having a first section of a first diameter, a third section of a third diameter, and a second section having a minimum diameter and an inlet converging from a second diameter smaller than said first diameter toward said minimum diameter; said second section positioned between said first and third sections with said inlet adjacent said first section, and said reaction flow passage abruptly widening from said second section to said third section so that by passing the vortex of hot combustion gases from said second section to said third section said gases are rapidly expanded; and
   (b) introducing a hydrocarbon feedstock axially into said vortex of hot combustion gases at a location adjacent the reactor wall at the upstream end of the first section.

7. A process as in claim 6 wherein the third section is adjacent the minimum diameter of the second section and the third diameter is 2 to 5 times larger than the minimum diameter of the second section.

8. A process as in claim 7 wherein the vortex of hot combustion gases is produced by combusting natural gas with about 50% by volume excess air and introducing the combustion products tangentially into the first section.

9. A process as in claim 8 wherein the first diameter is about 9 to 12 inches, wherein the second diameter is about 2 to 4 inches and wherein the minimum diameter of the second section is about 1 to 2 inches.

10. A process as in claim 9 wherein the first section has a length of about 3 to 6 inches; and wherein the second section has a length of about 3 to 8 inches and is frustoconically shaped and coverges in a downstream direction at an angle between the reactor axis and the frustoconical surface in the range of about 10° to about 18°.

* * * * *